(12) United States Patent
Moller

(10) Patent No.: US 11,795,727 B2
(45) Date of Patent: Oct. 24, 2023

(54) TRUCK AWNING

(71) Applicant: Scot R. Moller, Robstown, TX (US)

(72) Inventor: Scot R. Moller, Robstown, TX (US)

( * ) Notice: Subject to any disclaimer, the term of this patent is extended or adjusted under 35 U.S.C. 154(b) by 175 days.

(21) Appl. No.: 17/387,901

(22) Filed: Jul. 28, 2021

(65) Prior Publication Data

US 2021/0354536 A1 Nov. 18, 2021

Related U.S. Application Data

(63) Continuation-in-part of application No. 16/853,705, filed on Apr. 20, 2020, now Pat. No. 11,091,928.

(60) Provisional application No. 62/838,259, filed on Apr. 24, 2019.

(51) Int. Cl.
*E04H 15/06* (2006.01)
*B60J 7/12* (2006.01)
*B60P 3/34* (2006.01)

(52) U.S. Cl.
CPC ............... *E04H 15/06* (2013.01); *B60J 7/12* (2013.01); *B60P 3/343* (2013.01)

(58) Field of Classification Search
CPC ..................................................... E04H 15/06
See application file for complete search history.

(56) References Cited

U.S. PATENT DOCUMENTS

| | | | |
|---|---|---|---|
| 3,773,379 A | 11/1973 | Louseau | |
| 4,088,363 A * | 5/1978 | Palmer | B60P 3/341 135/88.13 |
| 4,310,194 A | 1/1982 | Biller | |
| 4,519,409 A | 5/1985 | Kinney | |
| 4,657,299 A | 4/1987 | Mahan | |
| 4,964,669 A | 10/1990 | Geier | |
| 5,238,288 A | 8/1993 | Chandler | |
| 5,335,960 A | 8/1994 | Benignu | |
| 5,364,154 A * | 11/1994 | Kaiser | B60P 3/341 296/105 |
| 5,385,377 A * | 1/1995 | Girard | B60J 7/104 296/108 |
| 5,601,104 A | 2/1997 | Perkins | |
| 5,660,425 A | 8/1997 | Weber | |
| D409,763 S | 5/1999 | Rogers | |
| 6,202,664 B1 | 3/2001 | Shenton | |
| 6,227,592 B1 | 5/2001 | Thacker | |
| 6,394,118 B1 | 5/2002 | Cikanowick | |
| 6,481,784 B2 | 11/2002 | Cargill | |
| 6,666,490 B1 | 12/2003 | Thacker | |
| 7,059,660 B1 | 6/2006 | Juola | |
| 7,147,265 B1 | 12/2006 | Schmeichel | |
| 7,481,480 B2 | 1/2009 | Thacker | |
| 7,568,491 B2 | 8/2009 | Banfill | |
| 7,677,641 B1 * | 3/2010 | Isoda | B60P 3/341 135/88.13 |
| D624,486 S | 9/2010 | Shipp | |
| 7,789,097 B1 | 9/2010 | Sotirkys | |
| 8,123,190 B2 | 2/2012 | Kost | |

(Continued)

*Primary Examiner* — David R Dunn
*Assistant Examiner* — Danielle Jackson
(74) *Attorney, Agent, or Firm* — G. Turner Moller, Jr.

(57) ABSTRACT

An awning is mounted in stake pockets of a truck bed and casts shade asymmetrically relative to its mount rearwardly toward the truck tailgate. The awning is braced by struts connecting the truck and the awning. The awning is pivoted between a stowed position overlying the truck rails to a position extending rearwardly of the truck bed.

20 Claims, 6 Drawing Sheets

(56) References Cited

U.S. PATENT DOCUMENTS

| | | |
|---|---|---|
| 9,096,291 B2 | 8/2015 | Perosino |
| 9,127,475 B2 | 9/2015 | LeAnna |
| 9,194,152 B1 | 11/2015 | Plasencia |
| 9,506,269 B2 | 11/2016 | Armstrong |
| 9,604,702 B2 | 3/2017 | Hough |
| 9,968,167 B2 | 5/2018 | Volin |
| 10,029,547 B2 | 7/2018 | Dunn |
| 10,053,160 B2 * | 8/2018 | Erlandson .............. B62D 35/00 |
| 10,145,140 B2 | 12/2018 | Woodard |
| 2010/0148534 A1 * | 6/2010 | Kneifl .................... B62D 33/04 |
| | | 296/183.1 |
| 2011/0108076 A1 | 5/2011 | Connot |
| 2011/0226297 A1 | 9/2011 | Rewis |

* cited by examiner

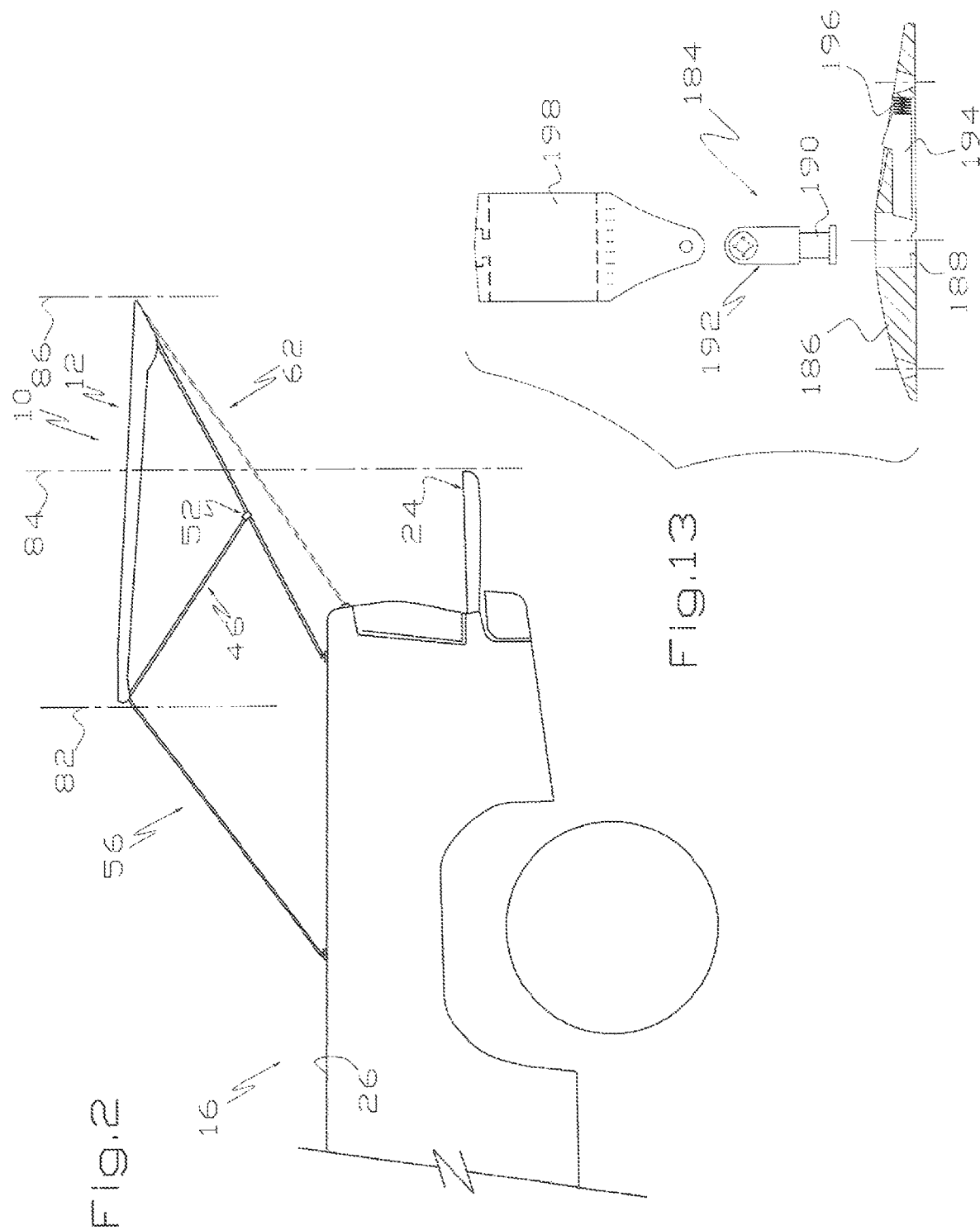

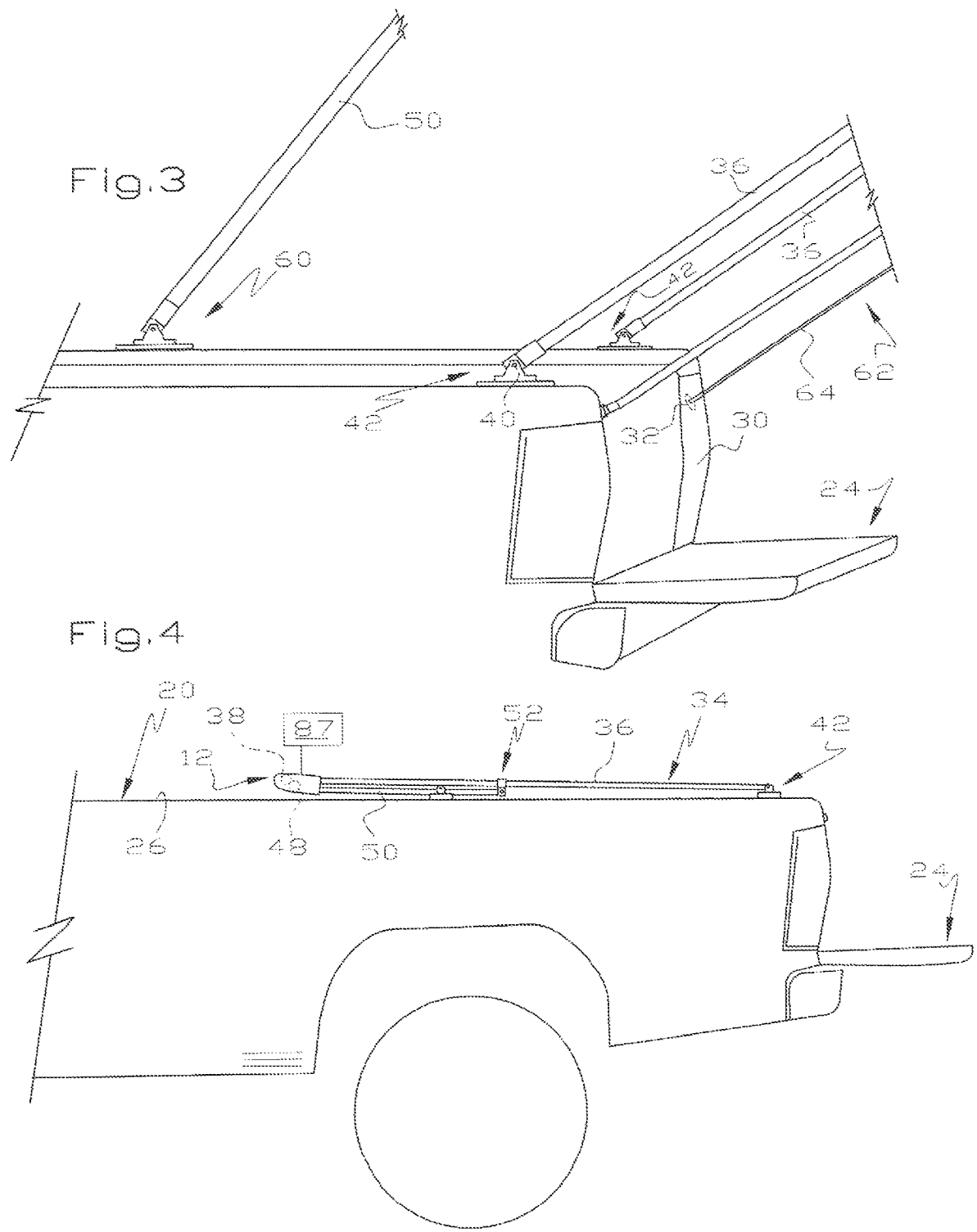

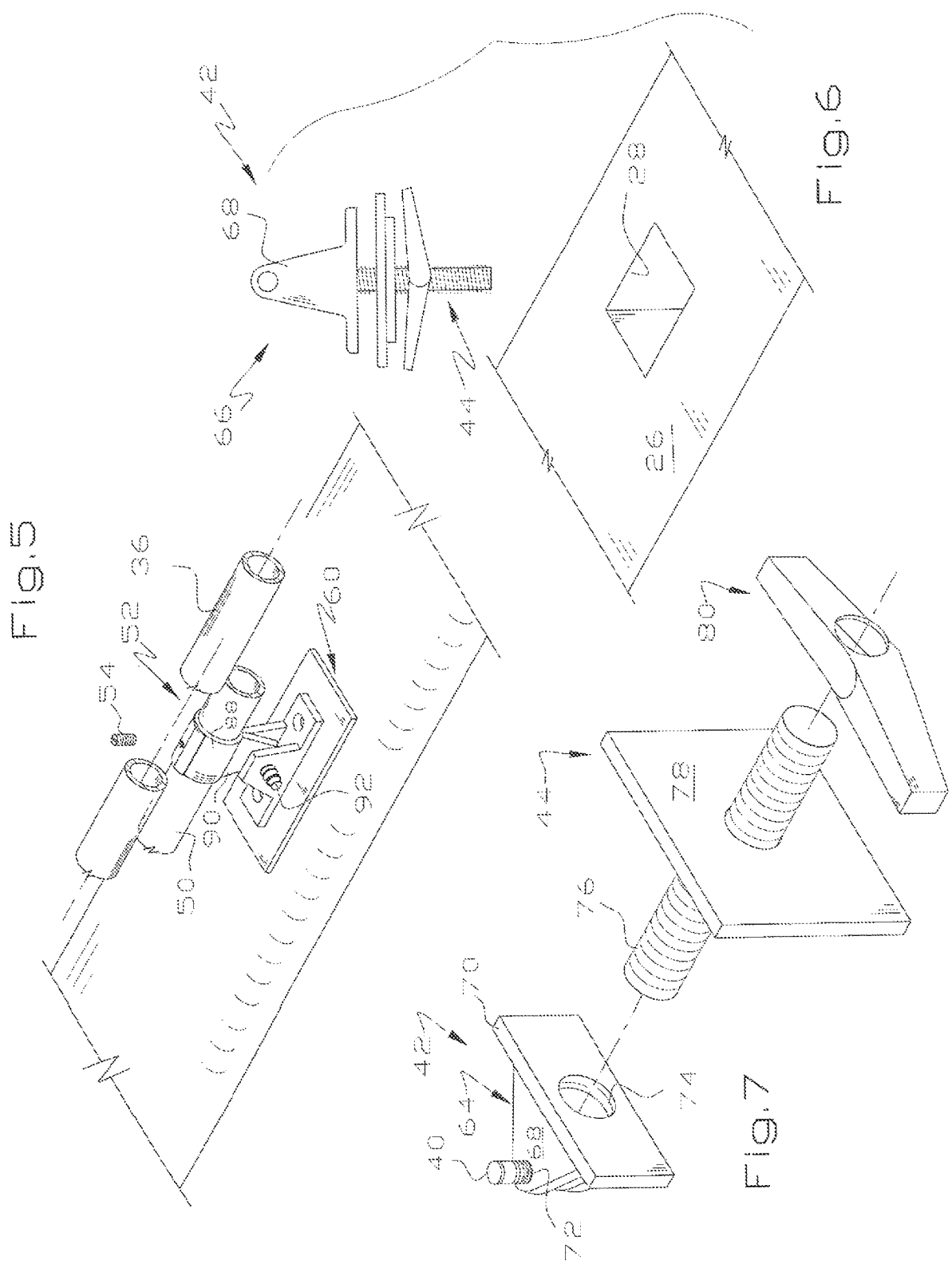

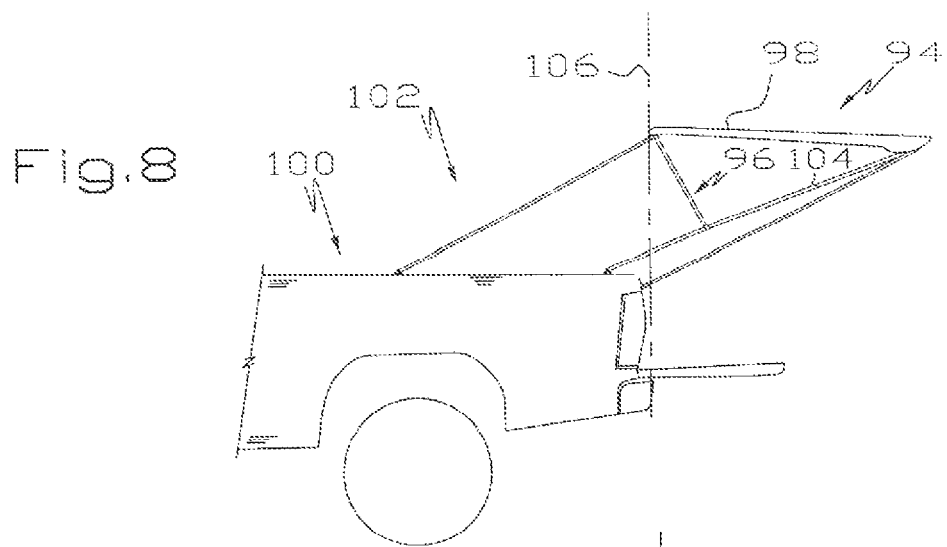
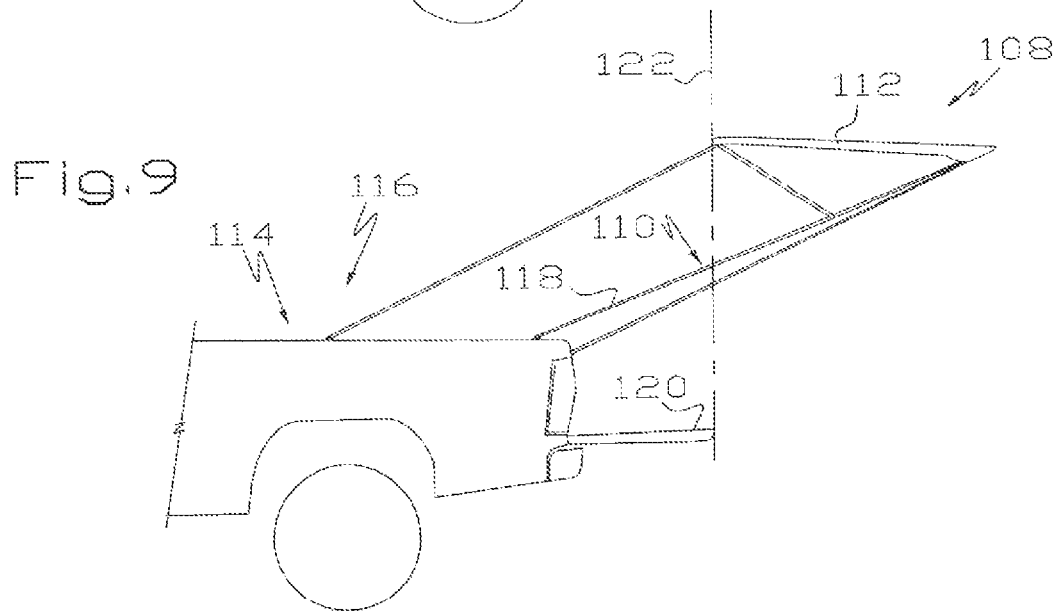
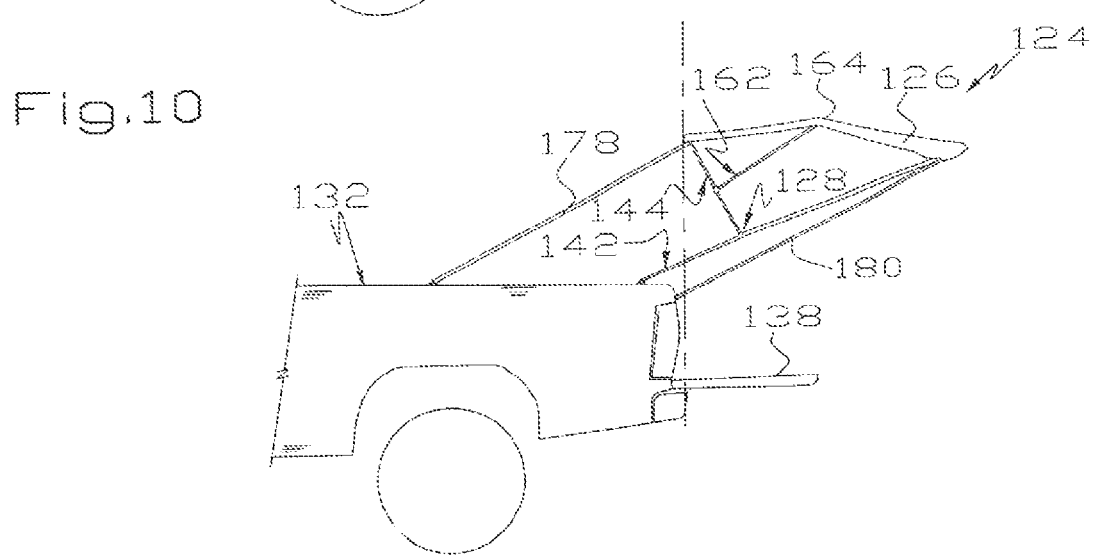

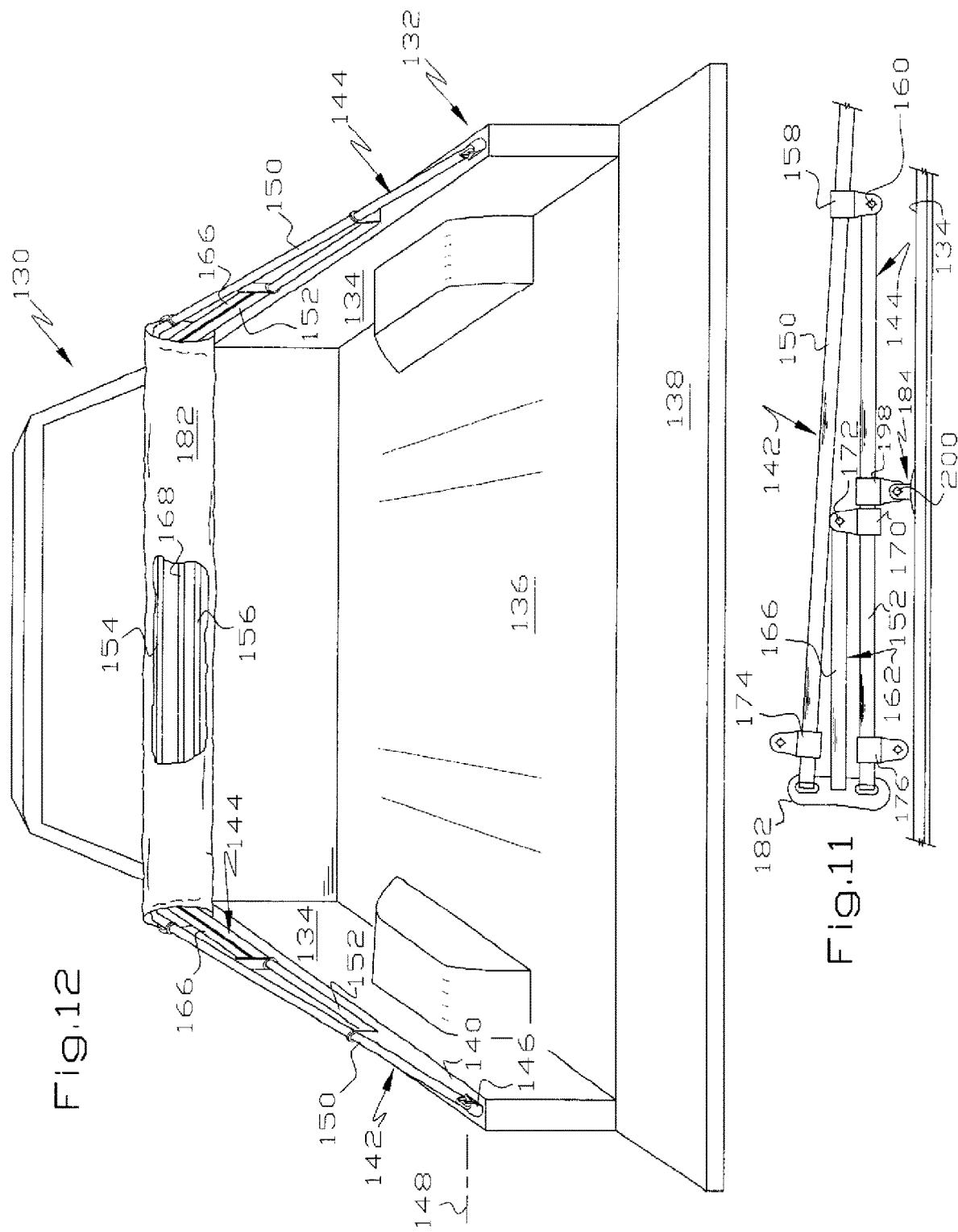

TRUCK AWNING

This application is a continuation-in-part of application Ser. No. 16/853,705, filed Apr. 20, 2020, now U.S. Pat. No. 11,091,928, issued Aug. 17, 2021, and is based on Provisional Patent Application 62/838,259, filed Apr. 24, 2019, priority of which is claimed and which is incorporated herein by reference.

BACKGROUND OF THE INVENTION

It occasionally occurs that it is desirable to work on, or near, the end of a truck. Often, these are work trucks such as welder's trucks but equally often they are standard pickup trucks. Standard pickup trucks are often used for either work or pleasure under circumstances where it is desirable to have an awning or canopy providing shade on or near the tailgate. Most current model pickup trucks include stake pockets in the rails of the truck bed. These pockets are used for a variety of applications including attaching tie down points or mounting a camper shell to the truck bed.

It is known in the prior art to provide an umbrella at the rear of welder's trucks. Similar disclosures are found in U.S. Pat. Nos. 6,481,784; 7,789,097; 8,123,190; 9,127,475; 9,506,269; 9,968,167 and 10,029,547.

SUMMARY OF THE INVENTION

An awning includes a frame and a flexible sheet material cover capable of flapping. The frame may connect to the stake pockets of a conventional truck bed and extend rearwardly to overlie or extend beyond a tailgate thereby providing shade rearwardly of an open tailgate. The awning may provide shade not only on the tailgate but also rearwardly of the tailgate where individuals likely stand or sit. In some embodiments, the awning may provide all shade from vertical sunlight rearwardly of the truck bed or rearwardly of an open tailgate of the truck. One or more braces may connect the frame to the truck bed thereby stabilizing the frame against excessive movement, even in high winds.

BRIEF DESCRIPTION OF THE DRAWINGS

FIG. 2 is a side view of the vehicle and awning of FIG. 1 illustrating an embodiment with an additional set of braces;

FIG. 3 is an isometric view from the left rear of the pickup of FIG. 1 illustrating the awning in a deployed configuration;

FIG. 4 is a view from one side of a vehicle illustrating the awning in a stowed position;

FIG. 5 is an enlarged partial view of the awning frame in a stowed position and illustrating a mounting fixture, certain parts being broken away for clarity of illustration;

FIG. 6 is an isometric view of a stake pocket and bracket used to attach the awning to a vehicle;

FIG. 7 is an enlarged view of a mount that fits in the stake pocket of the truck bed;

FIG. 8 is a side view of an embodiment of an awning casting all shade from vertical sunlight rearwardly of a truck bed; and FIG. 9 is a schematic view of another embodiment of an awning casting all shade from vertical sunlight rearwardly of an open tailgate;

FIG. 10 is a side view of another embodiment of the awning, illustrating the awning in a deployed position;

FIG. 11 is an enlarged side view of one end of the frame in the stowed position;

FIG. 12 is a pictorial view of a truck bed as viewed from the rear; and

FIG. 13 is an exploded partly cross-sectional view of a latch used to hold the frame securely against the truck rails.

DETAILED DESCRIPTION OF THE INVENTION

Figure 1:
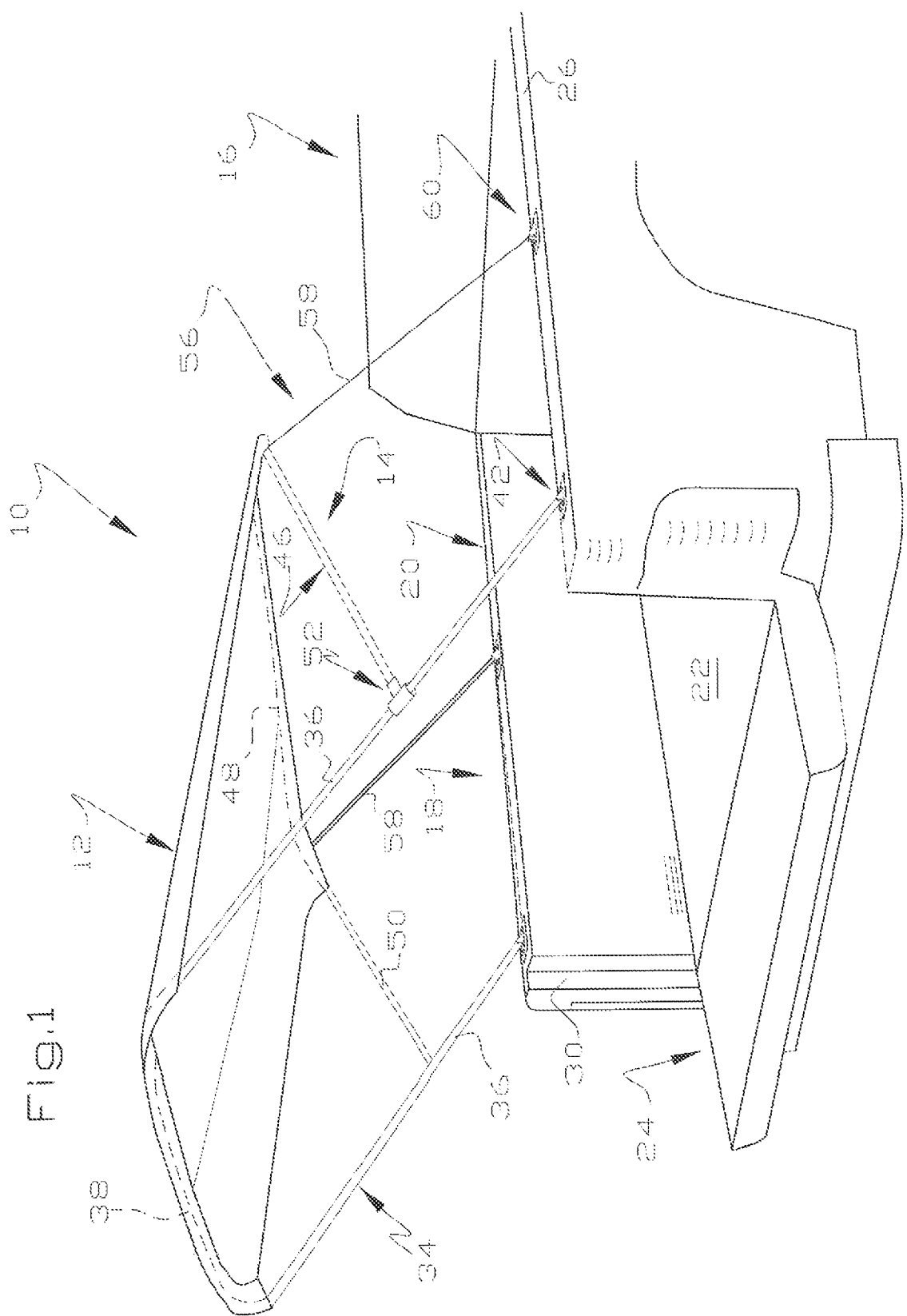
FIG. 1 is an isometric view from the right rear of a conventional pickup truck illustrating an awning disclosed herein.

The awning 10 includes a cover 12 supported by a frame 14 which is mounted on the rear of a truck 16. The truck 16 is illustrated as a conventional pickup truck having a truck bed 18 bounded by rails 20 and having a floor 22. A tailgate 24 may be pivotally mounted on the truck 16 to lie coplanar with the floor 22. The rails 20 may include a horizontal section 26 providing one or more upwardly opening conventional stake pockets 28. In its upright position, the tailgate 24 may nest inside a recess 30 provided by the rails 20. The tailgate 24 is conventionally latched in its upright position by a latch (not shown) on the tailgate 24 which cooperates with a stud 32 fixed to the truck 16 inside the recess 30. In some trucks, the stud 32 is a horizontally extending stub with an enlarged end. In other trucks, the stud 32 may be a U-shaped member fixed to the recess 30. Those skilled in the art will recognize the pickup truck 16 as being typical of currently available models.

The awning 10 may be of any suitable type and is illustrated as a bimini top common on small boats. The frame 14 may include a U-shaped support 34 having legs 36 and a crossbar or crosspiece 38. The support 34 may be one piece or in segments. The legs 36 are pivotally mounted for movement about an axis provided by pins 40 extending through a mount or a pair of brackets 42 secured in the stake pockets 28 by a connector 44. The frame 14 may also include a U-shaped support 46 including a crossbar 48 and legs 50 receiving a sliding sleeve assembly 52 which may be temporarily fixed to the legs 36 by a set screw 54 as explained more fully hereinafter. The legs 36 and/or the legs 50 may be of one piece, segmented or telescoping in any suitable manner. Conventional bimini tops cast shade symmetrically relative to its pivotal mount analogous to the bracket 42. It will be seen the cover 12 casts a shadow from vertical sunlight asymmetric relative to the bracket 42 toward the rear of the truck bed and, in some embodiments, beyond the open tailgate 24 as discussed more fully hereinafter.

As so far disclosed, the awning 10 is unstable because it is freely moveable about the pivot axis of the pin 40 and requires some bracing 56 to stabilize it. The amount, position and angle of the bracing 56 depends on the distribution of weight of the awning 10 relative to the pin 40. It is advantageous for the awning 10 to cast shade from vertical sunlight on and/or rearwardly of the tailgate 24, i.e. rearward relative to the normal direction of movement of the truck 16. With most combinations of frame 14 and cover 12, this means a major fraction of the weight of the awning 10 is rearward of the pin 40 meaning the awning 10 tends to rotate clockwise as viewed in the position of FIG. 2. Thus the bracing 56 may include struts 58 secured to fittings 60 on the rail 20 of the truck 16 and to the frame 14 or to the cover 12. The bracing 56 accordingly acts in tension to prevent counterclockwise rotation of the awning 10 as viewed in FIG. 1 and may be of any suitable type including rigid material, elastic bands such as bungee cords, or the like and may preferably be conventional inelastic webbing including a length adjusting buckle (not shown) and suitable end connectors for securement to the fittings 60, the frame 14 and/or the cover 12.

In high wind or rain, it may be desirable to have additional bracing 62 stabilizing the awning 10. To this end, the bracing 62 may include a second set of struts 64 which likewise may be rigid, elastic bands, inelastic webbing or the like removably attached to the stud 32 with a key-hole connector (not shown) at one end and to the frame 14 or to the cover 12 at the opposite end. In the alternative, suitable tie downs or clips (not shown) may be attached inside the recess 30 and the bracing 62 removably attached to them.

Referring to FIGS. 5-7, the brackets 42 and connectors 44 are illustrated in more detail. The brackets 42 may be modified from commercially bimini top brackets available from Overton's Inc. of Lincolnshire, Ill. and include a conventional housing 66 having spaced apart ears 68 extending from a base plate 70. The pin 40 is mounted in aligned openings in the ears 68 and includes a spring 72 biasing the pin 40 outwardly out of a position in the gap between the ears 68 so the frame 14 can be removed from the truck 16 and a normal position spanning the distance between the ears 68 for captivating the pin 40 between the ears 68. The pin 40 may be of conventional design including a pivoted end (not shown), hidden in FIG. 7, movable between a position coaxial with the pin 40 so the pin 40 can be removed from the bracket 42 and a transverse position captivating the pin 40 in the bracket 42. In a preferred embodiment, the connector 44 secures the bracket 42 in the stake pocket 28. The bracket 42 accordingly may include a threaded opening 74 (FIG. 7) provided in the housing 66 into which is placed a screw 76 comprising part of the connector 44.

The connector 44 is designed to be secured inside the stake pocket 28. The connector 44 may include a clamped plate 78 providing a base larger than the base plate 70 to provide a large surface area contacting the horizontal surface 26 of the rail 20 or to a lip of the stake pocket 28. A conventional toggle assembly 80 is threaded onto the screw 76. To attach the bracket 42 to the stake pocket 28, the housing 66 and plate 78 are positioned on top of the rail 20 and the toggle assembly 80 and screw 76 passed into the stake pocket 28. The bracket 42 is rotated to advance the toggle assembly 80 into load bearing engagement with a lip (not shown) of the stake pocket 28. This clamps the housing 66 and the plate 78 to the rail 20 and secures the bracket 42 to the stake pocket 28.

As shown in FIGS. 1-3, the fittings 60 provide an anchor for the bracing 56. The fittings 60 may be essentially the same as the bracket 42 and are secured in any suitable manner to the truck rail 20, preferably in another stake pocket (not shown) by a screw and toggle assembly similar to the screw 76 and toggle assembly 80. In other embodiments, the fitting 60 may be secured to the truck rail 20 by drilling a suitable hole (not shown) in the horizontal section 26 and securing the fitting 60 with the screw and toggle assembly. One advantage of the fitting 60 will become more fully apparent hereinafter.

As an alternative to securing the brackets 42 to the stake pockets 28, the brackets 42 may be secured to the bed rails 20 using either conventional screws to secure the base plate 68 to the rail 20.

The cover 12 may be of any suitable flexible sheet material capable of casting a shadow and has the capability of flapping. Bimini top material has proven satisfactory and is available from Overton's Inc. The cover 12 is secured to the crosspieces 38, 48 of the frame 14 in a conventional manner as shown in FIG. 1.

An important advantage of this invention is the ability to provide shade from vertical sunlight rearwardly of the tailgate 24 where people are apt to stand or sit. The amount of shade from vertical sunlight rearwardly of the tailgate 24 is a function of the length of the legs 36 and the angle of the legs 36 relative to the ground or to the truck 16. At least 30% of the cover 12 may be rearwardly of the open tailgate 24 and, as shown by a comparison of the distance between the vertical dash-dot lines 82, 84, 86 in FIG. 2. It may preferred that at least 50% of the cover 12 may provide shade from vertical sunlight rearwardly of the tailgate 24. As shown in FIG. 2, a substantial majority, i.e. at least 60% of a length of the cover, of shade cast by vertical sunlight is rearward of the truck bed 16. Even though the frame 14 may be overly complicated and expensive, there is no upper limit of the amount of the cover 12 that may be rearwardly of the tailgate 24.

The awning 10 may be stowed against the rails 20 of the truck 16 as shown in FIGS. 4 and 5. A boot 87 is used to enclose the cover 12 in the stowed position and keep it from flapping. This has the additional advantage of captivating the legs 36 and preventing the U-shaped support 34 from moving. In the stowed position, the legs 36, 50 lie above the truck rails 26 with the crosspieces 38, 48 spanning the distance between the legs 36, 50 and extending across the truck bed. Thus, the truck bed 22 is unobstructed or upwardly open to Earth's sky rearward of the crosspieces 38, 48 in the stowed position of the awning 10 as suggested in FIG. 4. When stowed, a substantial fraction of the truck bed 22 may accordingly be used in its normal and conventional manner, i.e. to receive goods, equipment or tools to be placed in the truck bed 22 over the tailgate 24 without interference by the awning 10. The width of the unobstructed area of the truck bed 22 is the width between the truck rails 20. The length of the unobstructed area of the truck bed 22 is the length of the legs 36 of the first support 34 plus the distance between the mount 42 and the end of the truck bed 22.

The fitting 60 advantageously cooperates with the sleeve assembly 52 to secure the frame 14 to the bed rail 20. The sleeve assembly 52 includes a sleeve 88 slidably mounted on each leg 50 and secured in place by the set screw 54. The sleeve assembly 52 includes a single tab 90 having an opening (not shown) therein receiving a spring actuated pin 92 and thereby captivate the sleeve assembly 52 to the fitting and thereby captivate the frame 14 to the bed rail 20.

Many current model pickup trucks have stake pockets on each rail 20 spaced at a distance conducive to sizing and positioning the awning 10 in a desirable location. For example, with appropriately positioned stake pockets and appropriately sized members 34, 46, the sleeve assemblies 52 can be secured correctly by simply folding the support 34 and strut 46 to their stowed position and securing the sleeve assemblies 52 with the set screws 54. Some pickups have only one appropriately positioned stake pocket at the rear of each rail 20 so the position of the fittings 60 may be set either by varying the position of the fittings 60 or by varying the length and angle of the braces 54.

To deploy the cover 12 from a stowed position of the awning 10 shown in FIG. 4, the frame 14 is released from the fittings 60 by manipulating the pins 92 and the boot 87 is removed thereby releasing the frame 14 and supports 34, 46 for movement. The U-shaped support 34 is pivoted clockwise in FIG. 2 and the sleeve assemblies 52 slide along the legs 36 and the U-shaped support 46 and the bracing 56 is installed to position the cover 12 at a desired location. The sleeve assemblies 52 are fixed to the legs 36 by tightening the set screws 54. The additional bracing 62 may be added as desired. To move the awning 10 from the extended position of FIGS. 1-2 back to the stowed position of FIG. 4 is basically the reverse.

Referring to FIG. 8, an awning 94 includes a frame 96 and a cover 98 mounted on a bed 100 of a truck 102. The frame 96 includes legs 104 of sufficient length and at a sufficient angle to the truck 102 to position the cover 98 so the cover 98 casts shade from vertical sunlight entirely rearwardly of the truck bed 100 as suggested by the vertical line 106. In such an embodiment, it may be desirable that the legs 104 be multipart or telescoping.

Referring to FIG. 9, an awning 108 includes a frame 110 and a cover 112 mounted on a bed 114 of a truck 116. The frame 110 includes legs 118 of sufficient length and at a sufficient angle to the truck 116 to position the cover 112 so the cover 112 casts shade from vertical sunlight entirely rearwardly of an open tailgate 120 the truck bed 114 as suggested by a vertical line 122. In such an embodiment, it may be desirable that the legs 118 be multipart or telescoping.

Referring to FIGS. 10-12, another embodiment of an awning 124 includes a cover 126 supported by a frame 128 which is mounted on the rear of a truck 130. The truck 130 is illustrated as a conventional pickup truck having a truck bed 132 bounded by rails 134 and having a floor 136. A tailgate 138 may be pivotally mounted on the truck 130 to lie coplanar with the floor 136. The rails 134 may include a horizontal section 140. In its upright position, the tailgate 138 may nest inside a recess (not shown) provided by the rails 134. The tailgate 138 is conventionally latched in its upright position by a latch (not shown) on the tailgate 138 which cooperates with a stud (not shown) fixed to the truck 130 inside the recess (not shown). Those skilled in the art will recognize the pickup truck 130 as being typical of currently available models.

The awning 124 includes a pair of U-shaped supports 142, 144 mounted on the truck rails 134 by a mount 146 for movement about a pivot axis 148 between a deployed or inclined position shown in FIG. 10 and a stowed position shown in FIGS. 11-12. The U-shaped supports 142, 144 include legs 150, 152 and a crosspiece 154, 156. As in the embodiment of FIGS. 1-7, the legs 152 of the support 144 may be mounted on the legs 150 of the support 142 by a sliding sleeve 158 pinned in place in any suitable manner as with a set screw (not shown) and pivot connection 160. A third U-shaped support 162 may be provided to provide a high spot on the cover 126. The high spot may be a ridge 164 on the cover 126 transverse to the direction of travel of the truck 130 to facilitate water draining from the cover 126. The U-shaped support 162 may elevate an intermediate section of the cover 126 above the otherwise planar surface of the cover 126.

The U-shaped support 162 may accordingly have legs 166 and a crosspiece 168 and be slidably mounted on one of the U-shaped supports 142, 144 by a sliding sleeve 170 and pivotal connection 172. The sleeve 170 may be pinned to the leg 152 in any suitable manner, as with a set screw (not shown). The U-shaped support 162 may simply slidably support the cover 126 or may be disposed in a sleeve (not shown) or captivated to the cover 126 by releasable loops (not shown) or another suitable device.

In some embodiments, connections 174, 176 are attached to the upward ends of the U-shaped supports 142, 144 and thereby provide an anchorage for struts 178, 180 which act in tension to stabilize the awning 124 and prevent it from pivoting clockwise in FIG. 10 beyond a preferred position.

In the deployed position of FIG. 10, the awning 10 may extend past the end of the truck bed 136 and past the end of the open tailgate as in the embodiments of FIGS. 1-9. In the stowed position of FIGS. 11-12, a boot 182 may enclose the cover 126 and the forward ends of the U-shaped supports 142, 144, 162 thereby preventing the cover 126 from flapping and preventing relative movement between the U-shaped supports 142, 144, 162. As shown in more detail in FIG. 13, a latch 184 may be provided between one of the support legs 152 and the truck rails 134. The latch 184 is of conventional construction comprising a base 186 attached to the truck rail 134 and having an opening 188 receiving a pin 190 of a connection 192. The base 186 includes a latch element 194 biased by a spring 196 toward the opening 188. When the connection 192 is advanced so the pin 190 enters the opening 188, the pin 190 biases the latch element 194 to the right in FIG. 13 so the pin 190 enters the opening 188 thereby allowing the latch element 194 to move to the right and thereby capture the pin 190. A pin 198 conveniently attaches the connection 192 to a sleeve 200 or anchor on the support leg 152.

Although this invention has been disclosed and described in its preferred form with a certain degree of particularity, it is understood that the present disclosure of the preferred form is only by way of example and that numerous changes in the details of operation and in the combination and arrangement of parts may be resorted to without departing from the spirit and scope of the invention.

I claim:

1. An awning for a truck having a truck bed bounded by a tailgate movable between a vertical closed position and an open position and rails having upright sides and a top, comprising:
   a frame and a mount, the frame and mount being configured to pivotally attach the frame to the truck rails for movement from a first inclined position extending from the truck rails partly past the open tailgate and a second stowed position;
   a cover mounted on the frame, the cover and frame being configured to position the cover at least partially rearward of the truck bed, the cover being of flexible sheet material capable of flapping;
   the frame comprising:
      a first U-shaped rigid support configured to support the cover, the first U-shaped support including a first pair of legs, and a first crosspiece extending between the first pair of legs, each leg of the first pair of legs being configured, in the second stowed position, to overlie a respective truck rail;
      a second U-shaped rigid support configured to support the cover, the second U-shaped support having a second pair of legs and a second crosspiece connecting the second pair of legs, each leg of the second pair of legs being configured to overlie a respective truck rail in the second stowed position; and
   a device configured to enclose the cover in they stowed position, configured to keep the cover from flapping in the stowed position and configured to prevent relative movement between the first and second U-shaped rigid supports in the stowed position.

2. The awning of claim 1 wherein the device is a boot.

3. The awning of claim 1 further comprising a third support configured to provide a high spot in the cover in the inclined position to facilitate water draining from the cover.

4. The awning of claim 3 wherein the third support is a U-shaped member mounted on the first U-shaped rigid support.

5. An awning for a truck having a truck bed bounded by a tailgate movable between a vertical closed position and an open position and a pair of rails having upright sides, comprising:
   a frame and a mount, the frame and mount being configured to attach the frame to the truck rails for movement from a first inclined position extending from the truck rails partly past the open tailgate and a second stowed position;
   a cover mounted on the frame, the cover and frame being configured to position the cover at least partially rearward of the truck bed, the cover being of flexible sheet material;
   the frame comprising:
      a first U-shaped rigid support configured to support the cover, the first U-shaped support including a first pair of legs and a first crosspiece extending between the first pair of legs, each leg of the first pair of legs being configured, in the second stowed position, to overlie a respective truck rail;
      a second U-shaped rigid support configured to support the cover, the second U-shaped support having a second pair of legs and a second crosspiece connecting the second pair of legs, each leg of the second pair of legs being configured to overlie a respective truck rail in the second stowed position; and
   the cover and frame being configured, in the stowed position of the cover and frame, to leave the truck bed upwardly open to Earth's sky, from the crosspieces of the U-shaped supports to the tailgate.

6. The awning of claim 5 further comprising a latch configured to releasably attach one of the U-shaped rigid supports to each truck rail.

7. The awning of claim 5 further comprising a third support configured to provide a high spot in the cover in the inclined position to facilitate water draining from the cover.

8. The awning of claim 7 wherein the third support is a U-shaped member mounted on the first U-shaped rigid support.

9. The awning of claim 7 wherein the high spot is a ridge transverse to the direction of travel of the truck.

10. An awning for a truck having a truck bed bounded by a tailgate movable between a vertical closed position and an open position and a pair of rails having upright sides, comprising:
    a frame and a mount, the frame and mount being configured to attach the frame to the truck rails for pivotal movement from a first inclined position extending from the truck rails partly past the open tailgate and a second stowed position;
    a cover mounted on the frame, the cover and frame being configured to position the cover at least partially rearward of the truck bed in the first inclined position;
    the frame comprising:
       a first U-shaped rigid support configured to support the cover, the first U-shaped support including a first pair of legs, each leg of the first pair of legs being configured, in the second stowed position, to overlie a respective truck rail, and a first crosspiece extending between the first pair of legs; and
       a second U-shaped rigid support configured to support the cover, the second U-shaped rigid support having a second pair of legs and a second crosspiece connecting the second pair of legs, each leg of the second pair of legs being configured to overlie a respective truck rail in the second stowed position;
    the first and second U-shaped rigid supports being configured to position the first and second crosspieces apart in the first inclined position and configured to place the first and second crosspieces adjacent one another in the second stowed position;
    the cover being configured to attach to the first and second crosspieces and configured to span the crosspieces in the spaced apart first inclined position to cast shade rearwardly of the truck bed, the cover being configured to accommodate movement of the first and second U-shaped rigid supports into the second stowed position.

11. The awning of claim 10 wherein the frame being mounted for pivotal movement about an axis and wherein a majority of the weight of the awning in the first inclined position being rearward of the axis and further comprising:
    bracing configured to connect the truck and the frame and stabilize the frame in the first inclined position, the bracing comprising at least one first flexible strut configured to connect the truck and the first U-shaped rigid support and at least one second flexible strut configured to connect the truck and the second U-shaped rigid support, the struts being configured to be inclined upwardly from the truck bed to the U-shaped supports in the first inclined position of the frame;
    the struts configured to act in tension and apply a restraining force to the U-shaped rigid supports preventing the awning from pivoting in a direction induced by weight of the awning.

12. The awning of claim 10 further comprising a device configured to enclose the cover in the stowed position, configured to keep the cover from flapping in the stowed position and configured to prevent relative movement between the first and second U-shaped rigid supports in the stowed position.

13. The awning of claim 10 further comprising a latch configured to releasably attach one of the U-shaped rigid supports to each truck rail.

14. The awning of claim 10 further comprising a third support configured to provide a high spot in the cover in the inclined position to facilitate water draining from the cover.

15. The awning of claim 14 wherein the third support is a U-shaped member mounted on the first U-shaped rigid support.

16. The awning of claim 14 wherein the high spot is a ridge.

17. An awning for a truck having a truck bed bounded by a tailgate movable between a vertical closed position and an open position and rails having upright sides, comprising:
    a frame and a mount, the frame and mount being configured to attach the frame to the truck rails for pivotal movement from a first inclined position extending from the truck rails partly past the open tailgate and a second stowed position;
    a cover mounted on the frame, the cover and frame being configured to position the cover at least partially rearward of the truck bed in the first inclined position;
    the frame comprising:
       a first U-shaped rigid support configured to support the cover, the first U-shaped support including a first pair of legs, each leg of the first pair of legs being configured, in the second stowed position, to overlie a respective truck rail, and a first crosspiece extending between the first pair of legs;

a second U-shaped rigid support configured to support the cover, the second U-shaped support having a second pair of legs and a second crosspiece connecting the second pair of legs, each leg of the second pair of legs being configured to overlie a respective truck rail in the second stowed position; and a third support configured to provide a high spot in the cover in the inclined position to facilitate water draining from the cover.

18. The awning of claim 17 wherein the third support comprises a U-shaped member having a third pair of legs and a third cross-piece, each leg of the third pair of legs being configured to overlie a respective truck rail in the second stowed position.

19. The awning of claim 18 wherein the third U-shaped member is mounted on the first U-shaped rigid support.

20. The awning of claim 17 wherein the high spot is a ridge transverse to the direction of travel of the truck.

\* \* \* \* \*